(12) United States Patent
Kikuchi et al.

(10) Patent No.: US 11,409,775 B2
(45) Date of Patent: Aug. 9, 2022

(54) RECOMMENDING DOCUMENTS SETS BASED ON A SIMILAR SET OF CORRELATED FEATURES

(71) Applicant: INTERNATIONAL BUSINESS MACHINES CORPORATION, Armonk, NY (US)

(72) Inventors: Hiroaki Kikuchi, Yokohama (JP); Fumihiko Terui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 16/593,310

(22) Filed: Oct. 4, 2019

(65) Prior Publication Data
US 2020/0034379 A1 Jan. 30, 2020

Related U.S. Application Data

(63) Continuation of application No. 15/193,353, filed on Jun. 27, 2016, now Pat. No. 10,474,704.

(51) Int. Cl.
*G06F 16/33* (2019.01)
*G06F 16/338* (2019.01)
(Continued)

(52) U.S. Cl.
CPC .......... *G06F 16/334* (2019.01); *G06F 16/338* (2019.01); *G06F 16/3322* (2019.01); *G06F 16/3329* (2019.01); *G06F 16/951* (2019.01)

(58) Field of Classification Search
CPC .............. G06F 16/334; G06F 16/3322; G06F 16/3329; G06F 16/338; G06F 16/951
See application file for complete search history.

(56) References Cited

U.S. PATENT DOCUMENTS 6,633,868 B1 10/2003 Min
9,047,380 B1 6/2015 Lish
(Continued)

FOREIGN PATENT DOCUMENTS

JP 5486667 B2 5/2014

OTHER PUBLICATIONS

Ramos, "Using tf-idf to determine word relevance in document queries," Proceedings of the first instructional conference on machine learning, vol. 242. No. 1, 2003. (Year: 2003).*
(Continued)

*Primary Examiner* — Jay A Morrison
(74) *Attorney, Agent, or Firm* — Dmitry Paskalov (57) ABSTRACT

A method for recommending a plurality of alternate search keywords is provided. The method may include executing a first search query using a plurality of user-entered search text. The method may also include identifying a highest contribution keyword to a plurality of search results of the executed first search query. The method may further include identifying a highest correlation alternate keyword to the identified highest contribution keyword. The method may also include creating an alternate keyword group by replacing the identified highest contribution keyword with the identified highest correlation alternate keyword. The method may further include executing a second search query using the created alternate keyword group. The method may also include displaying the plurality of search results associated with the executed first search query with a plurality of statistics associated with the executed second search query.

20 Claims, 7 Drawing Sheets

(51) Int. Cl.
*G06F 16/332* (2019.01)
*G06F 16/951* (2019.01)

(56) References Cited

U.S. PATENT DOCUMENTS

| | | | |
|---|---|---|---|
| 9,064,005 B2 | 6/2015 | Stensmo | |
| 9,372,895 B1 * | 6/2016 | Zamansky | G06F 16/3322 |
| 10,474,704 B2 | 11/2019 | Kikuchi | |
| 2001/0044795 A1 | 11/2001 | Cohen | |
| 2003/0037034 A1 | 2/2003 | Daniels | |
| 2004/0153463 A1 | 8/2004 | Sasai | |
| 2005/0055357 A1 | 3/2005 | Campbell | |
| 2008/0082511 A1 | 4/2008 | Williams | |
| 2009/0112834 A1 | 4/2009 | Cordes | |
| 2009/0198674 A1 | 8/2009 | Custis | |
| 2009/0216735 A1 | 8/2009 | Dexter | |
| 2011/0035403 A1 | 2/2011 | Ismalon | |
| 2011/0093455 A1 * | 4/2011 | Benyamin | G06F 16/951 |
| | | | 707/723 |
| 2015/0220547 A1 | 8/2015 | Wu | |
| 2015/0339290 A1 | 11/2015 | Mueller | |
| 2018/0189614 A1 * | 7/2018 | Chen | G06F 16/951 |

OTHER PUBLICATIONS

IBM: List of IBM Patents or Patent Applications Treated as Related (Appendix P), Mar. 10, 2020, pp. 1-2.

Chen et al., "A Novel Query Expansion Method for Military News Retrieval Service," International Conference on Asian Language Processing {IALP), 2014, p. 183-186, IEEE.

Leake et al., "Exploiting Rich Context: An Incremental Approach to Context-Based Web Search," Modeling and Using Context, 2005, p. 254-267, LNAI 3554, Springer-Verlag Berlin Heidelberg.

Mell et al., "The NIST Definition of Cloud Computing," National Institute of Standards and Technology, Sep. 2011, p. 1-3, Special Publication 800-145.

* cited by examiner

RECOMMENDING DOCUMENTS SETS BASED ON A SIMILAR SET OF CORRELATED FEATURES

BACKGROUND

The present invention relates, generally, to the field of computing, and more particularly to search query data processing.

A search engine is a program capable of searching for information across one or more databases. To assist in locating desired information, the search engine receives a user-entered search query. Typically, search engines support informational queries, navigational queries, and transactional queries. Once information related to the user-entered search query is located, the search engine presents the located information to the user in a preconfigured order.

SUMMARY

According to one embodiment, a method for recommending a plurality of alternate search keywords is provided. The method may include executing a first search query using a plurality of user-entered search text. The method may also include identifying a highest contribution keyword to a plurality of search results of the executed first search query. The method may further include identifying a highest correlation alternate keyword to the identified highest contribution keyword. The method may also include creating an alternate keyword group by replacing the identified highest contribution keyword with the identified highest correlation alternate keyword. The method may further include executing a second search query using the created alternate keyword group. The method may also include displaying the plurality of search results associated with the executed first search query with a plurality of statistics associated with the executed second search query.

According to another embodiment, a computer system for recommending a plurality of alternate search keywords is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include executing a first search query using a plurality of user-entered search text. The method may also include identifying a highest contribution keyword to a plurality of search results of the executed first search query. The method may further include identifying a highest correlation alternate keyword to the identified highest contribution keyword. The method may also include creating an alternate keyword group by replacing the identified highest contribution keyword with the identified highest correlation alternate keyword. The method may further include executing a second search query using the created alternate keyword group. The method may also include displaying the plurality of search results associated with the executed first search query with a plurality of statistics associated with the executed second search query.

According to yet another embodiment, a computer program product for recommending a plurality of alternate search keywords is provided. The computer program product may include one or more computer-readable storage devices and program instructions stored on at least one of the one or more tangible storage devices, the program instructions executable by a processor. The computer program product may include program instructions to execute a first search query using a plurality of user-entered search text. The computer program product may also include program instructions to identify a highest contribution keyword to a plurality of search results of the executed first search query. The computer program product may further include program instructions to identify a highest correlation alternate keyword to the identified highest contribution keyword. The computer program product may also include program instructions to create an alternate keyword group by replacing the identified highest contribution keyword with the identified highest correlation alternate keyword. The computer program product may further include program instructions to execute a second search query using the created alternate keyword group. The computer program product may also include program instructions to display the plurality of search results associated with the executed first search query with a plurality of statistics associated with the executed second search query.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to search query data processing. The following described exemplary embodiments provide a system, method, and program product to, among other things, provide search query results to a user along with alternate search keyword groups that include correlated words to the original user-entered search terms. Therefore, the present embodiment has the capacity to improve the technical field of search query data processing by performing search queries of keywords words identified through machine learning as synonymous or closely related to keywords within the user-entered search terms and calculating statistics related to the performed search queries.

As previously described, a search engine is a program capable of searching for information across one or more databases. To assist in locating desired information, the search engine receives a user-entered search query. Typically, search engines support informational queries, navigational queries, and transactional queries. Once information related to the user-entered search query is located, the search engine presents the located information to the user in a preconfigured order.

Recently, the practical use of machine learning has been implemented in search engines. Machine learning may replace a conventional keyword search system based on a heuristic information acquisition technique. In the application of many supervised machine learning algorithms, manual collection of data is required to gather information that is directly relevant to the user-entered keywords. Although searching all information within a corpus is unnecessary within such a system, a comprehensive search is desirable in order to detect as many correct characteristic patterns as possible.

For assisting in the collection of a question sentence (i.e. natural language) and documents containing relevant information to the user-entered search terms, a keyword-based search system may be utilized. In a keyword-based search, a list of answer candidates is analyzed and, if appropriate, a particular search result may be flagged. If a search result is inappropriate, a flag may not be assigned to that particular search result. Data collection of search results may be conducted based on information assigned as appropriate to the search. Utilizing a search engine for collecting data allows for more efficient identification of characteristic patterns among search results.

With respect to keyword searches, the connecters "and" and "or" may be used to further refine the results gathered by the search engine. For example, if two words in a keyword search are connected by the word "and," the search engine may only return search results that contain the two words connected by the word "and." Generally, use of keywords connected by the "and" condition increases the probability of each search result being an appropriate search result. However, completeness of the search results is reduced since alternate responses are reduced. Conversely, use of keywords connected by the "or" condition increases noise (i.e. inappropriate responses) within the search results while allowing for a greater field of search results. As such, it may be advantageous, among other things, to implement a system that identifies keywords related to, but not included within, the user-entered question sentence to present to the user as alternate keyword groups to the user-entered keywords.

According to one embodiment, a keyword search query may be interactively presented that leads to many appropriate search results being identified by a search engine. The contribution of each user-entered keyword may be calculated to identify which user-entered keywords appear in the most search results. Additionally, a correlation value may be calculated for each user-entered keyword within the keyword search. The higher-ranked keyword groups may be used as features that represent a context of the search results. On a highest contribution to lowest contribution keyword basis, the user-entered keywords may be replaced by the highest correlation value keywords. A subsequent search query may be executed for each new keyword set that substitutes at least one user-entered keyword with a highly correlated keyword. Statistics, such as the correlation value of the subsequent keyword set to the user-entered keyword set and the multiplicity of the subsequent keyword set, may be calculated and displayed within a graphical user interface to a user along with the search results of the user-entered search query.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze a user-entered search query for keywords with the highest contribution to the search results, determine highly correlated words to the user-entered keywords, and execute a subsequent search query where at least one user-entered keyword is substituted by a highly correlated keyword.

Figure 1:
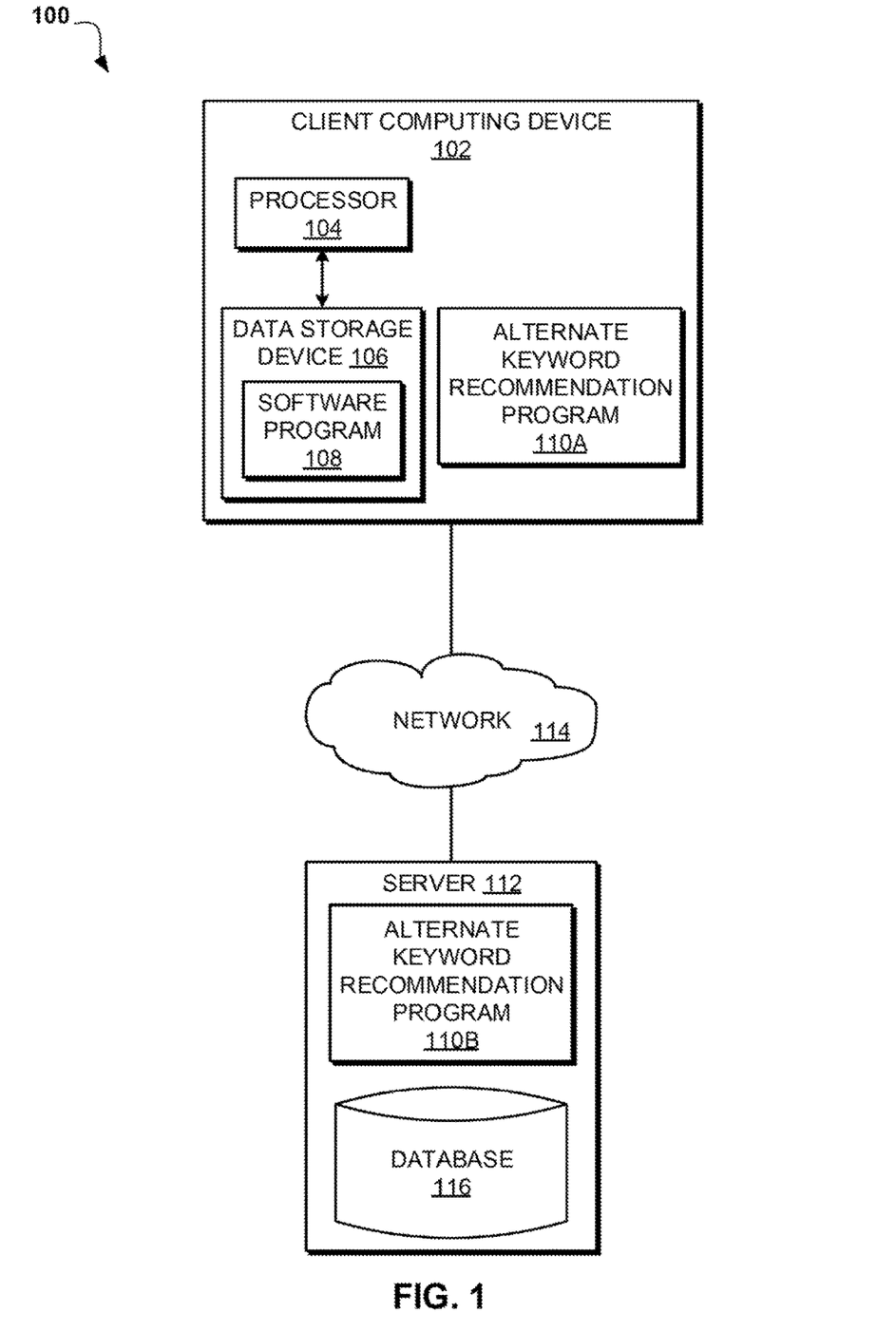
FIG. 1 illustrates an exemplary networked computer environment according to at least one embodiment.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a software program 108 and an alternate keyword recommendation program 110A and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an alternate keyword recommendation program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the alternate keyword recommendation program 110A, 110B may be a program capable of calculating a contribution value for each keyword in a search query for a set of search results, calculating a group of correlated keywords for each keyword in a search query, substituting a user-entered keyword in the search query with a highly correlated word, executing a subsequent search query, and calculating statistics that compare the results of the user-entered search query to the results of the subsequent search query. The query recommendation method is explained in further detail below with respect to FIGS. 2A, 2B, and 3.

Figure 2A:
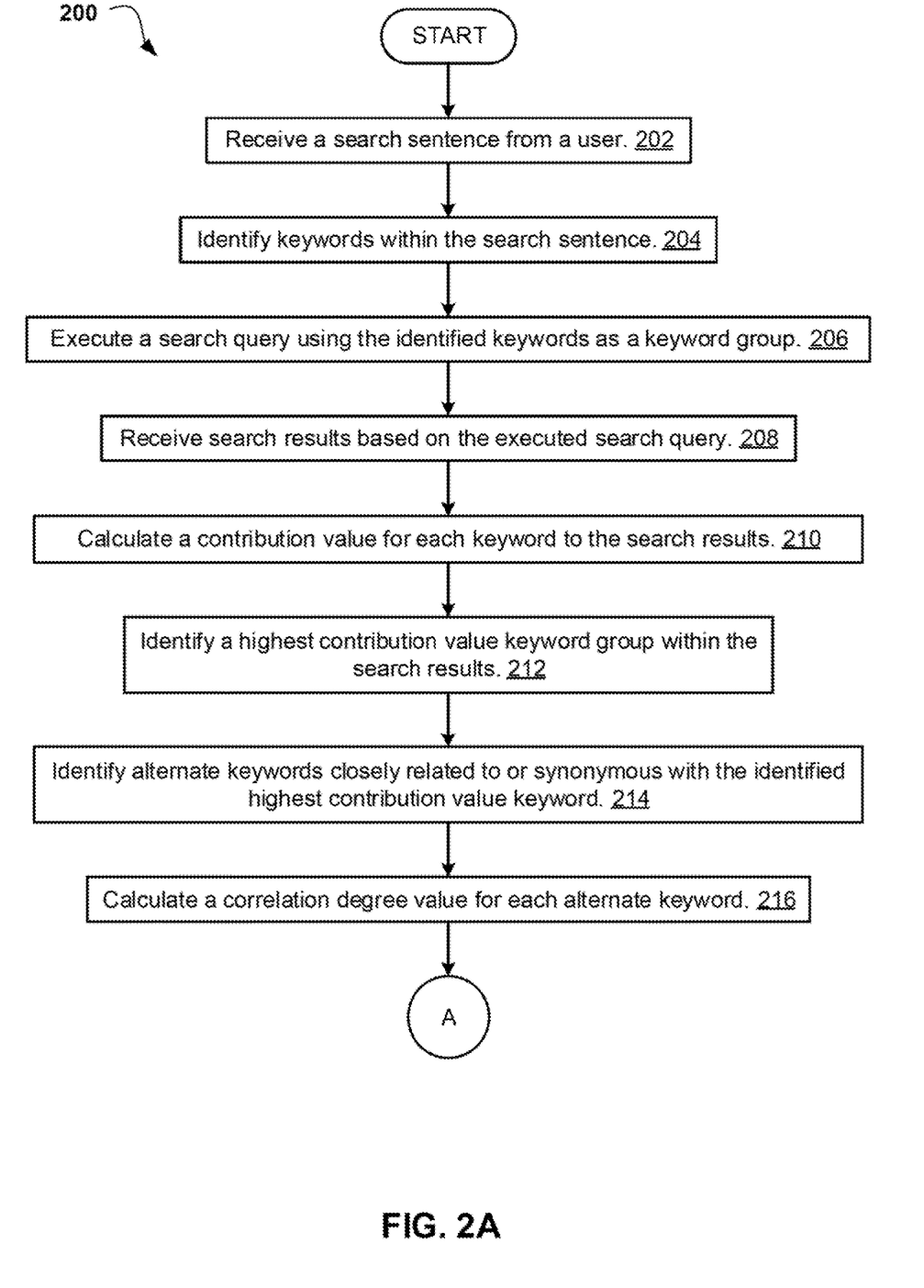
FIGS. 2A and 2B are an operational flowchart illustrating an alternate keyword recommendation process according to at least one embodiment.
Figure 2B:
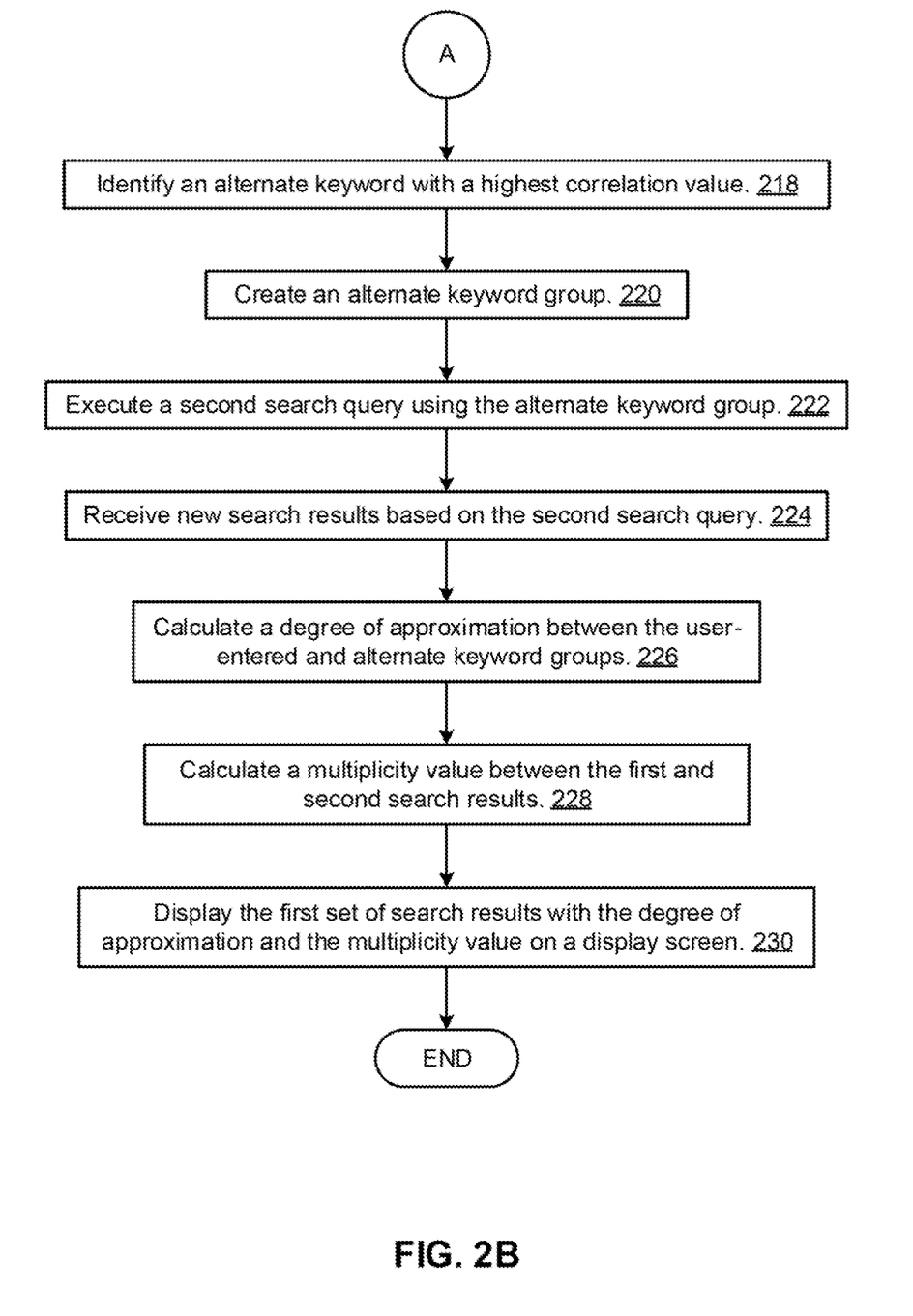

Referring now to FIGS. 2A, and 2B, an operational flowchart illustrating an alternate keyword recommendation process 200 is depicted, according to at least one embodiment. In FIG. 2A, at 202, the alternate keyword recommendation program 110A, 110B receives a search sentence from a user. The search sentence received by the alternate keyword recommendation program 110A, 110B may be a set of keywords or natural language. For example, if a user is searching for a thin laptop made by IBM® (IBM and all IBM-based trademarks and logos are trademarks or registered trademarks of International Business Machines Corporation and/or its affiliates), the received search sentence may be the natural language sentence "I want to buy a thin IBM® laptop" or the keywords "thin IBM® laptop."

Then, at 204, the alternate keyword recommendation program 110A, 110B identifies keywords within the search sentence. If search sentence received by the alternate keyword recommendation program 110A, 110B is a natural language sentence, the alternate keyword recommendation program 110A, 110B may utilize known natural language processing techniques, such as automatic summarization, to identify keywords within the natural language sentence. For example, if the received search sentence is the natural language sentence "I want to buy a thin IBM® laptop," the alternate keyword recommendation program 110A, 110B may implement natural language processing techniques to identify the keywords of the sentence to be "thin," "IBM®," and "laptop."

Next, at 206, the alternate keyword recommendation program 110A, 110B executes a search query using the identified keywords as a keyword group. The keywords within the received search sentence may be grouped together by the alternate keyword recommendation program 110A, 110B into a keyword group. Once the keywords are grouped together, the alternate keyword recommendation program 110A, 110B may execute a search query using a search engine. As previously described, a search engine is a program capable of searching for information across one or more databases 116. For example, the alternate keyword recommendation program 110A, 110B may utilize an internet search engine to execute a search query using the keywords "thin," "IBM®," and "laptop" as a keyword group.

Then, at 208, the alternate keyword recommendation program 110A, 110B receives search results based on the executed query. Upon searching the one or more databases 116, the search engine may return search results relevant to the keyword group used to execute the search query. For example, once a search for the keywords "thin," "IBM®," and "laptop" is executed by the internet search engine, the alternate keyword recommendation program 110A, 110B may receive the results of that search query in various forms, such as text, images, or videos.

Next, at 210, the alternate keyword recommendation program 110A, 110B calculates a contribution value for each keyword to the search results. The alternate keyword recommendation program 110A, 110B may analyze each keyword within the search sentence to determine the contribution each keyword has in the received search results. Using known term frequency-inverse document frequency (i.e., tf-idf) techniques, the alternate keyword recommendation program 110A, 110B may calculate a contribution score for each keyword in the keyword group used to execute the search query. Term frequency-inverted document frequency may relate to a standard for representing the importance of a particular term within a document of a corpus, such as a query search results. Term frequency-inverted document frequency may be an effective tool in distinguishing highly relevant terms from irrelevant terms due to a contribution score, or value, calculated for each term within a search keyword group. According to one embodiment, the formula for calculating the contribution value for each keyword within the search keyword group may be represented as:

$$(1+\log(\text{numDocs}/\text{docfreq}+1))$$

where numDocs may represent the number of documents (e.g., number of total search result hits) within the search results and docfreq may represent the number of documents within the search results within which a particular keyword appears.

Then, at 212, the alternate keyword recommendation program 110A, 110B identifies a highest contribution value keyword within the keyword group search results. Once a contribution value is calculated for each keyword within the searched keyword group, the alternate keyword recommendation program 110A, 110B determines which keyword within the searched keyword group has the highest calculated contribution score. For example, if the keyword group searched includes the keywords "thin," "IBM®," and "laptop" and the contribution score for each keyword is 40%, 35%, and 25%, respectively, the alternate keyword recommendation program 110A, 110B may identify the keyword "thin" as the keyword with the highest contribution score within the search keyword group.

Next, at 214, the alternate keyword recommendation program 110A, 110B identifies alternate keywords closely related to or synonymous with the keyword with the highest contribution score. A keyword used within the original search query may have synonyms or other closely related words with similar meanings. The alternate keyword recommendation program 110A, 110B may identify the synonymous or closely related words through known semantic analysis techniques, such as a thesaurus. Additionally, the alternate keyword recommendation program 110A, 110B may identify the synonymous or closely related words through analyzing high frequency words appearing in the search results of the executed search query. For example, a search query may be executed for the keyword group of "thin," "IBM®," and "laptop." Within the search results, a document may contain the word "lightweight" in place of "thin." Therefore, based on the use of the word "lightweight" within the context of the document, the alternate keyword recommendation program 110A, 110B may identify the word "lightweight" as being synonymous or closely related to the word "thin."

Then, at 216, the alternate keyword recommendation program 110A, 110B calculates a correlation value for each alternate keyword. The correlation value may be a similarity rating between a keyword within the keyword group and an alternate keyword for the identified keyword. Furthermore, the correlation value may be calculated as a comparison between an observed value of the number of occurrences of a keyword within a set of search results and the expected, or estimated, number of occurrences of the keyword in a refined portion of the set of search results. In at least one embodiment, the formula for calculating the correlation value of an alternate keyword in a refined set of the search results may be:

$$(measured\_value)/(observed\_value) \times ((num\_ref\_docs)/(total\_doc\_num))$$

where measured_value may represent the number of occurrences of a keyword within a refined search result set, observed_value may represent the observed value of the keyword within the entire search result set, num_ref_docs may represent the size of the refined set of search results, and total_doc_num may represent the total size of the entire search result set.

Referring now to FIG. 2B, at 218, the alternate keyword recommendation program 110A, 110B identifies an alternate keyword with a highest correlation value. Once each alternate keyword has a calculated correlation value (step 216), the alternate keyword recommendation program 110A, 110B may identify the alternate keyword with the highest calculated correlation value. For example, if the keyword "thin" has identified alternate keywords of "lightweight," "cool," and "compact" with correlation values of 10.3, 7.2, and 3.9, respectively, the alternate keyword recommendation program 110A, 110B may identify the alternate keyword "lightweight" as alternate keyword with the highest correlation value.

Then, at 220, the alternate keyword recommendation program 110A, 110B creates an alternate keyword group. The alternate keyword recommendation program 110A, 110B may create the alternate keyword group by replacing the highest contributing keyword with the highest correlation value alternate keyword. For example, in the previous hypothetical, if the alternate keyword recommendation program 110A, 110B identified the highest contributing keyword to a keyword group as the keyword "thin" and the highest correlation value alternate keyword to the keyword "thin" was identified as the alternate keyword "lightweight," the alternate keyword recommendation program 110A, 110B may replace the keyword "thin" with the alternate keyword "lightweight" in the keyword group. Therefore, an alternate keyword group would be created that includes the keywords "lightweight," "IBM®," and "laptop."

Next, at 222, the alternate keyword recommendation program 110A, 110B executes a second search query using the alternate keyword group. Similar to step 206, the alternate keyword recommendation program 110A, 110B may execute a search query of the alternate keyword group using a search engine. For example, the alternate keyword recommendation program 110A, 110B may execute a search query using the keywords "lightweight," "IBM®," and "laptop" as the alternate keyword group.

Then, at 224, the alternate keyword recommendation program 110A, 110B receives new search results based on the second search query. Similar to step 208, the alternate keyword recommendation program 110A, 110B may receive search results relevant to the search query executed for the alternate keyword group. For example, once search for the alternate keyword group of "lightweight," "IBM®," and "laptop" is executed by the internet search engine, the alternate keyword recommendation program 110A, 110B may receive the search results of the second search query in various forms, such as text, images, or videos.

Next, at 226, the alternate keyword recommendation program 110A, 110B calculates a degree of approximation between the user-entered and the alternate keyword groups. The alternate keyword recommendation program 110A, 110B may calculate a degree of approximation of highly correlated words between the original keyword group and the alternate keyword group. The degree of approximation of highly correlated words may be represented on a 100 point scale where a higher value is associated with two highly correlated keyword groups. For example, if the alternate keyword recommendation program 110A, 110B calculates a degree of approximation of 95 between a user-entered keyword group and an alternate keyword group, the two keyword groups may be very highly correlated. The degree of approximation of highly correlated words may be calculated in the same manner as the correlation value for each word within the keyword group as previously described in step 216.

Then, at 228, the alternate keyword recommendation program 110A, 110B calculates a multiplicity value between the first and the second search results. The multiplicity value may relate to the similarity between the search results received from the first search query with the user-entered keyword group and the search results of the second search query with the alternate keyword group. Similar to the degree of approximation of highly correlated words, the multiplicity value may be represented on a 100 point scale where a higher value is associated with the second set of search results having more identical search results to the first set of search results. For example, if both the first set and second set of search results returned 100 items within each set and the alternate keyword recommendation program 110A, 110B calculated a multiplicity value of 95 between the two sets of search results, then the first set of search results and the second set of search results share many identical documents within the respective search results.

Next, at 230, the alternate keyword recommendation program 110A, 110B displays the first set of search results and a recommendation to search the alternate keyword group along with the degree of approximation of highly correlated words associated with the alternate keyword group and the multiplicity value associated with the second set of search results on a display screen. The alternate keyword recommendation program 110A, 110B may present the first set of search results to the user through a graphical user interface on a display screen of the client computing device 102. Furthermore, the alternate keyword recommendation program 110A, 110B may include a recommendation to the user to search the alternate keyword group. The recommendation to search the alternate keyword group may include the degree of approximation of highly correlated words associated with the alternate keyword group and the multiplicity value associated with the second set of search results. The displayed results are described in more detail below with respect to FIG. 3. For example, in the previously described situation, the alternate keyword recommendation program 110A, 110B may display the search results for the keyword group of "thin," "IBM®," and "laptop" to a user and include a recommendation to search the alternate keyword group of "lightweight," "IBM®," and "laptop" along with the calculated degree of approximation of highly correlated words and the calculated multiplicity value associated with the alternate keyword group and the set of search results associated with the alternate keyword group.

Figure 3:
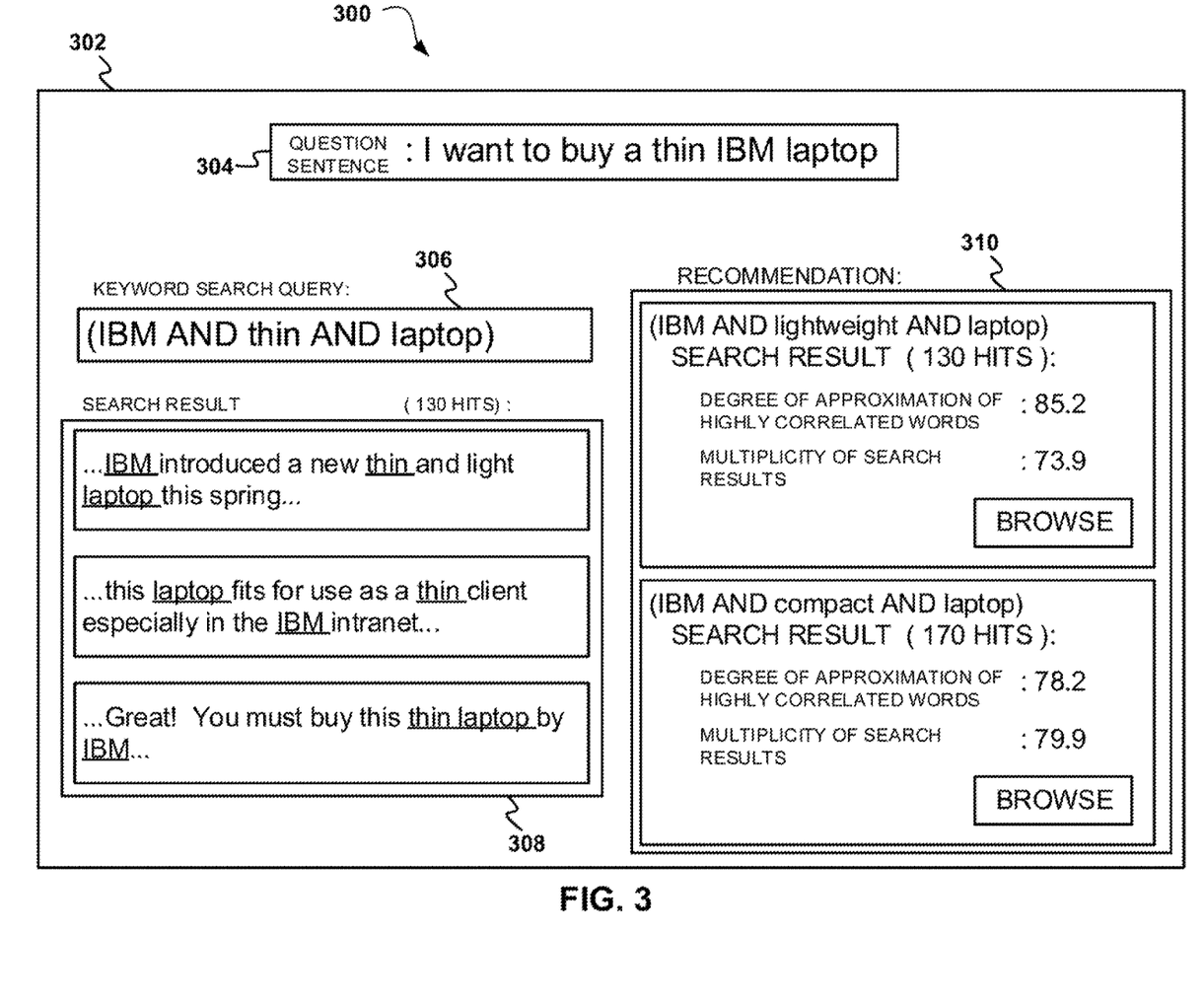
FIG. 3 is an exemplary graphical user interface displaying keyword search query results according to at least one embodiment.

Referring now to FIG. 3, an exemplary graphical user interface displaying keyword search query results 300 is depicted, according to at least one embodiment. When the alternate keyword recommendation program 110A, 110B displays the keyword search query results 300 to the user, the keyword search query results 300 may be presented on a graphical user interface 302 of a display screen associated with a user device, such as client computing device 102. Within the graphical user interface 302, the alternate keyword recommendation program 110A, 110B may also display the user-entered question sentence 304, the keyword search query 306 executed by the alternate keyword recommendation program 110A, 110B, the search results 308 of the executed keyword search query 306, and recommended alternate keyword search queries 310. As previously described, each alternate keyword search group within the recommended alternate keyword search queries 310 may include a calculated degree of approximation of highly correlated words to the keyword search query 306 and a calculate multiplicity value to the search results 308.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
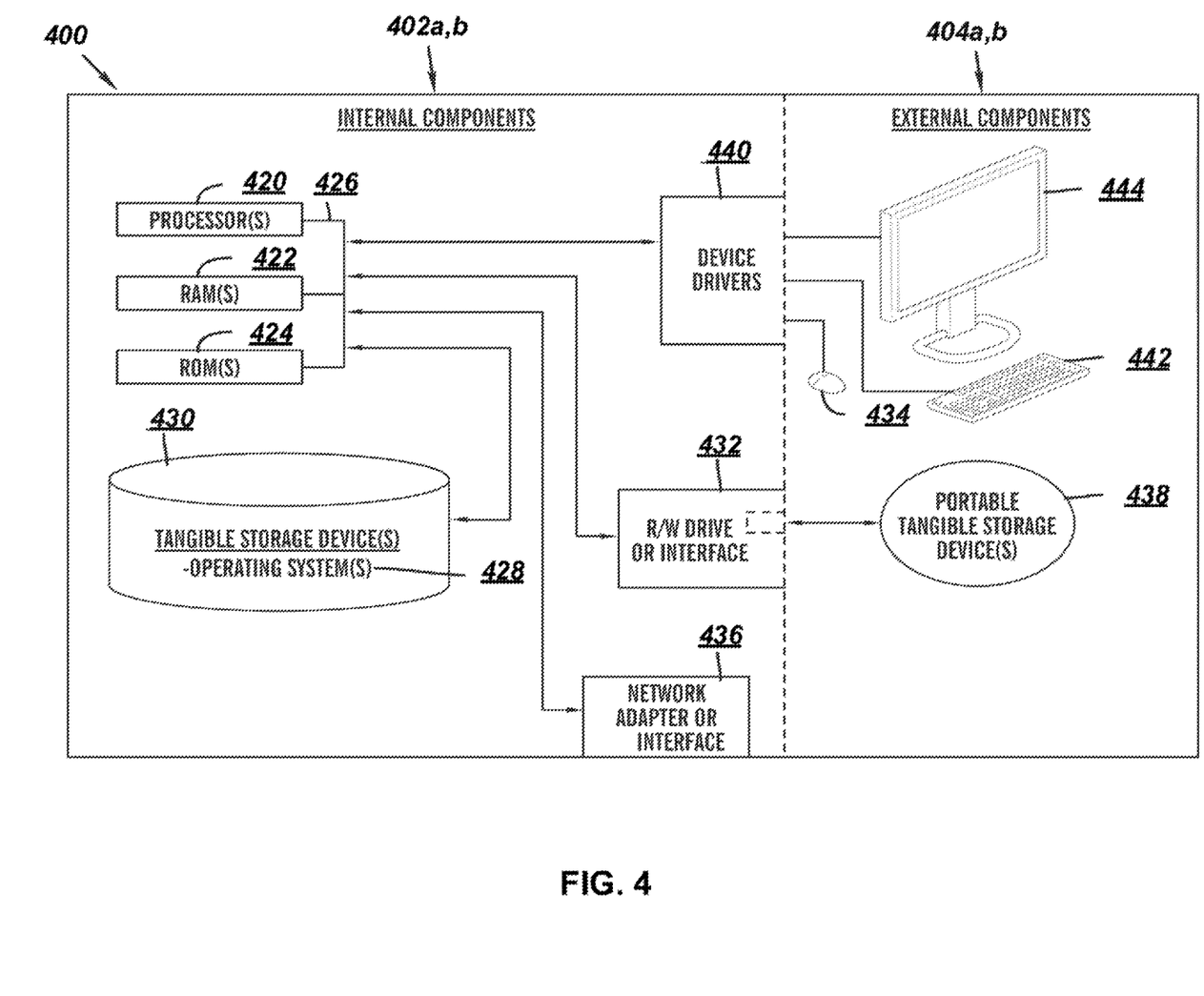
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the alternate keyword recommendation program 110A in the client computing device 102, and the alternate keyword recommendation program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the alternate keyword recommendation program 110A, 110B, can be stored on one or more of the respective portable computer-readable tangible storage devices 438, read via the respective R/W drive or interface 432, and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the alternate keyword recommendation program 110A in the client computing device 102 and the alternate keyword recommendation program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and alternate keyword recommendation program 110A in the client computing device 102 and the alternate keyword recommendation program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
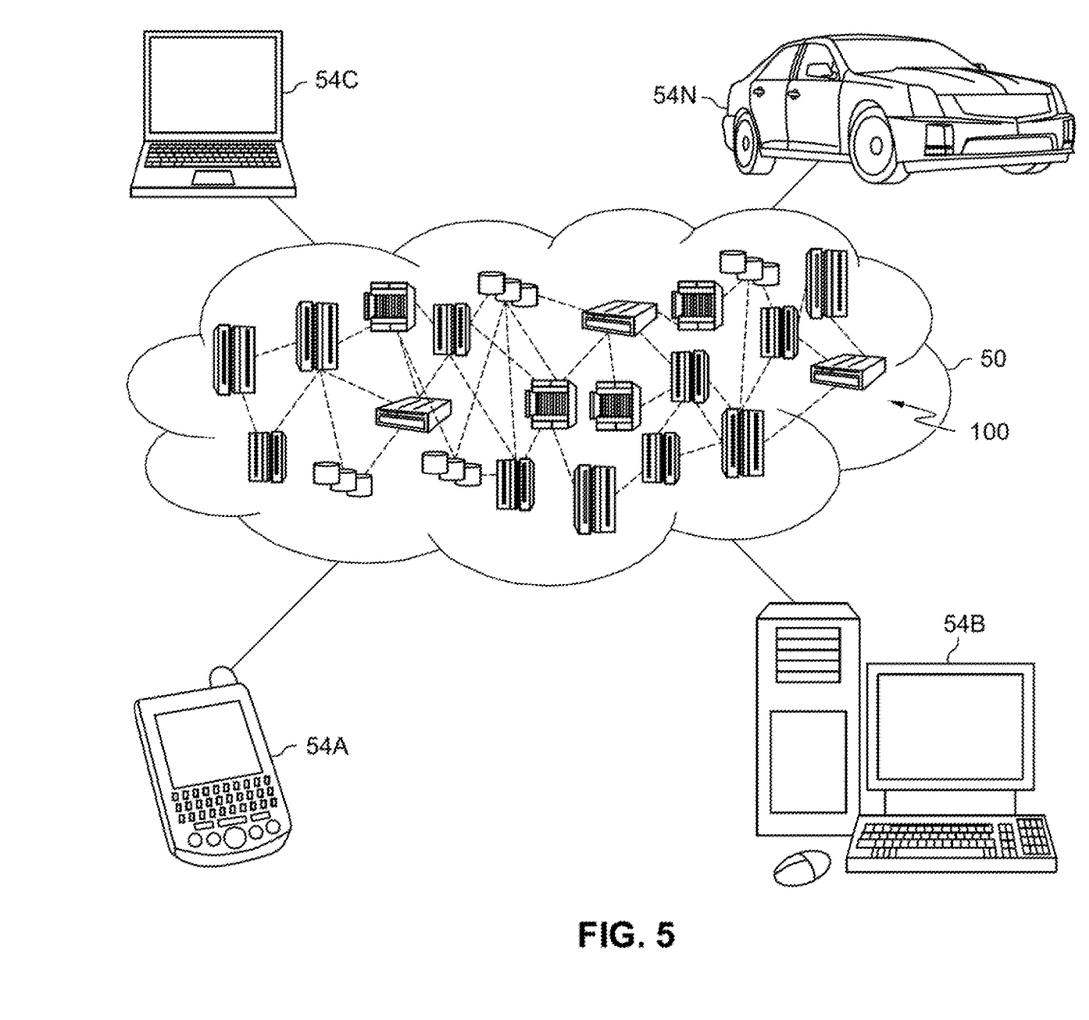
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
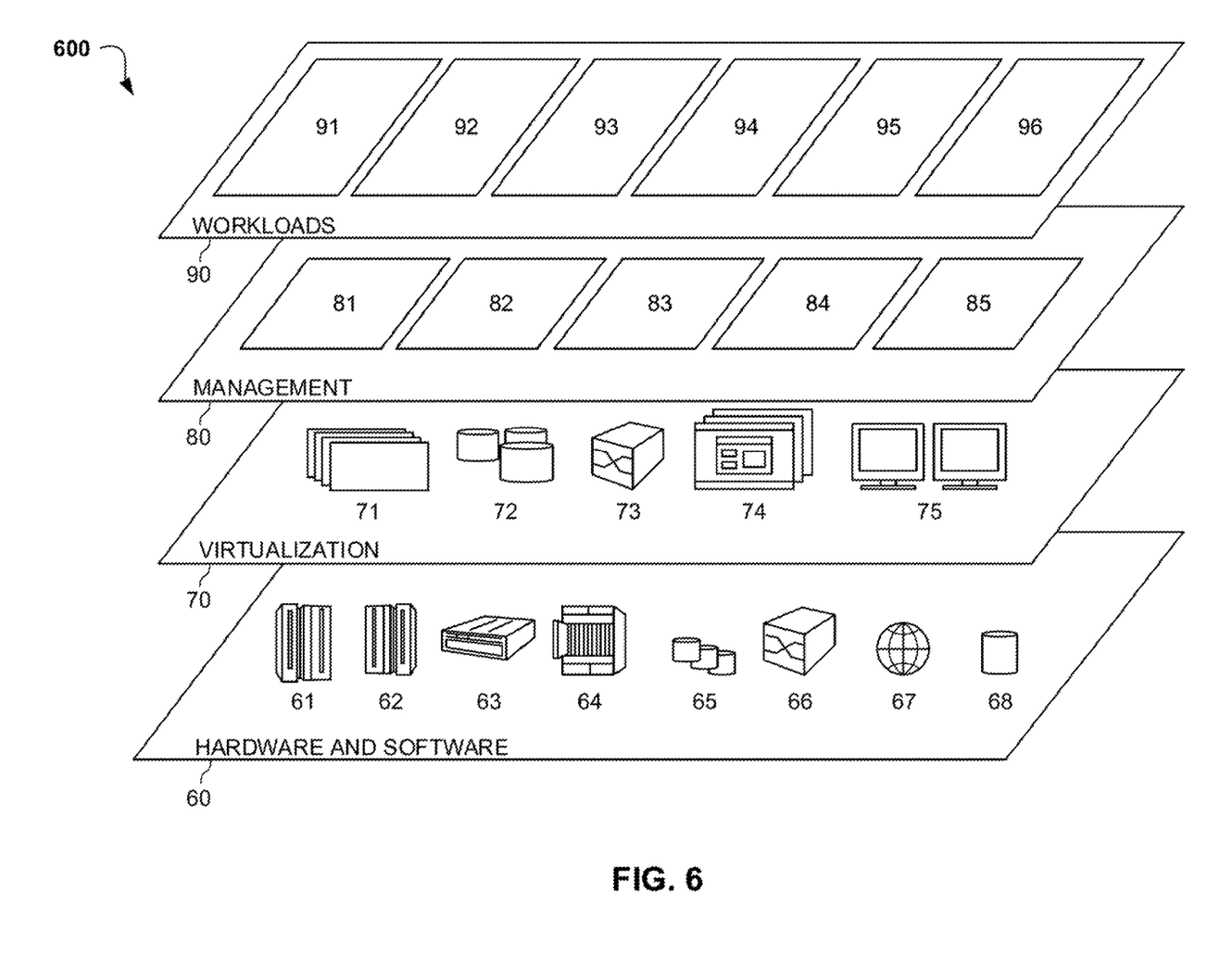
FIG. 6 depicts abstraction model layers according to an embodiment of the present invention.

Referring now to FIG. 6 a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alternate keyword recommendation 96. Alternate keyword recommendation 96 may relate to calculating a contribution value for each user-entered keyword in a search query and correlation score for alternate keywords to use in the user-entered keyword sentence. Additionally, alternate keyword recommendation 96 may include displaying statistical data to a user along with relevant alternate keyword searches.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for improving data processing of a plurality of user-entered search text by recommending a plurality of alternate search keywords, the method comprising:

executing, by a processor, a first search query using the plurality of user-entered search text;

identifying a highest contribution keyword from a keyword group based on a plurality of search results of the executed first search query, wherein identifying the highest contribution keyword based on calculating a contribution value of each keyword from the executed first search query to a plurality of search results, wherein the contribution value is calculated using an equation (1+log(numDocs/docfreq+1)), wherein numDocs is a number of total search result hits, and wherein docfreq is a number of documents within the search results within which a particular keyword appears;

identifying a highest correlation alternate keyword from the keyword group to the identified highest contribution keyword, wherein the highest correlation alternate keyword is identified using the contribution value calculated for each keyword from the keyword group;

creating an alternate keyword group from the keyword group by replacing the identified highest contribution keyword with the identified highest correlation alternate keyword; and executing a second search query using the created alternate keyword group.

2. The method of claim 1, wherein the plurality of user-entered search text is selected from a group consisting of a search sentence and a plurality of keywords, and further comprising:

in response to the plurality of user-entered search text being a search sentence, identifying a plurality of keywords associated with the search sentence using at least one natural language processing technique.

3. The method of claim 1, wherein the first search query is based on the keyword group identified from the plurality of user-entered search text using an automatic summarization.

4. The method of claim 1, further comprising:

executing a second search query using the created alternate keyword group; and displaying, using a graphical user interface, the plurality of search results associated with the executed first search query and the plurality of search results associated with the executed second search query coupled with a plurality of statistics associated with the executed second search query.

5. The method of claim 1, wherein identifying the highest correlation alternate keyword further comprises:

identifying a plurality of alternate keywords closely related to or synonymous with the identified highest contribution keyword; and calculating a correlation value for each alternate keyword within the identified plurality of alternate keywords.

6. The method of claim 5, wherein the correlation value is a comparison between a measured value of a number of occurrences of a keyword in a search result set and an expected number of occurrences of the keyword in a refined portion of the search result set.

7. The method of claim 4, wherein the plurality of statistics is selected from a group consisting of a degree of approximation and a multiplicity value.

8. The method of claim 7, wherein the degree of approximation is a comparison of a correlation between an original keyword group used to execute the first search query and the created alternate keyword group used to execute the second search query.

9. The method of claim 7, wherein the multiplicity value is a value representing a similarity between the plurality of search results of the executed first search query and a plurality of search results of the executed second search query.

10. A computer system for improving data processing of a plurality of user-entered search text by recommending a plurality of alternate search keywords, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

executing a first search query using the plurality of user-entered search text;

identifying a highest contribution keyword from a keyword group based on a plurality of search results of the executed first search query, wherein identifying the highest contribution keyword based on calculating a contribution value of each keyword from the executed first search query to a plurality of search results, wherein the contribution value is calculated using an equation (1+log(numDocs/docfreq+1)), wherein numDocs is a number of total search result hits, and wherein docfreq is a number of documents within the search results within which a particular keyword appears;

identifying a highest correlation alternate keyword from the keyword group to the identified highest contribution keyword, wherein the highest correlation alternate keyword is identified using the contribution value calculated for each keyword from the keyword group;

creating an alternate keyword group from the keyword group by replacing the identified highest contribution keyword with the identified highest correlation alternate keyword; and executing a second search query using the created alternate keyword group.

11. The computer system of claim 10, wherein the plurality of user-entered search text is selected from a group consisting of a search sentence and a plurality of keywords, and further comprising:

in response to the plurality of user-entered search text being a search sentence, identifying a plurality of keywords associated with the search sentence using at least one natural language processing technique.

12. The computer system of claim 10, wherein the first search query is based on the keyword group identified from the plurality of user-entered search text using an automatic summarization.

13. The computer system of claim 10, further comprising:

executing a second search query using the created alternate keyword group; and displaying, using a graphical user interface, the plurality of search results associated with the executed first search query and the plurality of search results associated with the executed second search query coupled with a plurality of statistics associated with the executed second search query.

14. The computer system of claim 10, wherein identifying the highest correlation alternate keyword further comprises:

identifying a plurality of alternate keywords closely related to or synonymous with the identified highest contribution keyword; and calculating a correlation value for each alternate keyword within the identified plurality of alternate keywords.

15. The computer system of claim 14, wherein the correlation value is a comparison between a measured value of a number of occurrences of a keyword in a search result set and an expected number of occurrences of the keyword in a refined portion of the search result set.

16. The computer system of claim 13, wherein the plurality of statistics is selected from a group consisting of a degree of approximation and a multiplicity value.

17. The computer system of claim 16, wherein the degree of approximation is a comparison of a correlation between an original keyword group used to execute the first search query and the created alternate keyword group used to execute the second search query.

18. The computer system of claim 16, wherein the multiplicity value is a value representing a similarity between the plurality of search results of the executed first search query and a plurality of search results of the executed second search query.

19. A computer program product for improving data processing of a plurality of user-entered search text by recommending a plurality of alternate search keywords, the computer program product comprising:

one or more computer-readable tangible storage medium and program instructions stored on at least one of the one or more tangible storage medium, the program instructions executable by a processor, the program instructions comprising:

program instructions to execute a first search query using the plurality of user-entered search text;

program instructions to identify a highest contribution keyword from a keyword group based on a plurality of search results of the executed first search query, wherein program instructions to identify the highest contribution keyword are based on calculating a contribution value of each keyword from the executed first search query to a plurality of search results, wherein the contribution value is calculated using an equation $(1+\log(\text{numDocs}/\text{docfreq}+1))$, wherein numDocs is a number of total search result hits, and wherein docfreq is a number of documents within the search results within which a particular keyword appears;

program instructions to identify a highest correlation alternate keyword from the keyword group to the identified highest contribution keyword, wherein the highest correlation alternate keyword is identified using the contribution value calculated for each keyword from the keyword group;

program instructions to create an alternate keyword group from the keyword group by replacing the identified highest contribution keyword with the identified highest correlation alternate keyword; and program instructions to execute a second search query using the created alternate keyword group.

20. The computer program product of claim 19, wherein the plurality of user-entered search text is selected from a group consisting of a search sentence and a plurality of keywords, and further comprising:

in response to the plurality of user-entered search text being a search sentence, program instructions to identify a plurality of keywords associated with the search sentence using at least one natural language processing technique.

\* \* \* \* \*